US009005844B2

(12) United States Patent
Ohmori et al.

(10) Patent No.: US 9,005,844 B2

(45) Date of Patent: *Apr. 14, 2015

(54) STRUCTURE OF SOLID OXIDE FUEL CELL

(75) Inventors: Makoto Ohmori, Nagoya (JP); Takashi Ryu, Nagoya (JP); Toshiaki Kuno, Nagoya (JP); Tadashi Otagiri, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 161 days.

This patent is subject to a terminal disclaimer.

(21) Appl. No.: 13/178,881

(22) Filed: Jul. 8, 2011

(65) Prior Publication Data

US 2012/0034547 A1 Feb. 9, 2012

(30) Foreign Application Priority Data

Jul. 15, 2010 (JP) ................................. 2010-160503
Sep. 27, 2010 (JP) ................................. 2010-214705

(51) Int. Cl.
*H01M 8/12* (2006.01)
*H01M 8/24* (2006.01)
*H01M 8/02* (2006.01)

(52) U.S. Cl.
CPC ............ *H01M 8/0273* (2013.01); *Y02E 60/521* (2013.01); *H01M 8/1286* (2013.01); *H01M 8/2425* (2013.01); *H01M 2008/1293* (2013.01); *Y02E 60/525* (2013.01)

(58) Field of Classification Search
USPC ................................. 429/480, 497, 479, 495
See application file for complete search history.

(56) References Cited

U.S. PATENT DOCUMENTS

2006/0147778 A1 7/2006 Matsuzaki et al.
2006/0153974 A1* 7/2006 Matsuzaki et al. ............ 427/115
2012/0034547 A1 2/2012 Ohmori et al.
2012/0107715 A1 5/2012 Ohmori et al.

FOREIGN PATENT DOCUMENTS

EP 1 603 183 A1 12/2005
JP 8-106916 4/1996
JP 2005-174722 * 6/2005 ............. H01M 8/02
JP 2008-084683 4/2008
JP 2008-226789 9/2008
JP 4541296 7/2010
WO 2004/082058 A1 9/2004
WO 2012/008385 1/2012
WO 2012/008386 1/2012

OTHER PUBLICATIONS

European Search Report, European Patent Application No. 11806715.6, dated May 10, 2013 (7 pages).

* cited by examiner

*Primary Examiner* — Gregg Cantelmo
(74) *Attorney, Agent, or Firm* — Burr & Brown, PLLC

(57) ABSTRACT

On each of upper and lower surfaces of a flat-plate-like support substrate having a longitudinal direction and having fuel gas flow channels formed therein, a plurality of power-generating elements A connected electrically in series are disposed at predetermined intervals along the longitudinal direction. On each of the upper and lower surfaces of the support substrate, a plurality of recesses are formed at predetermined intervals along the longitudinal direction. Each of the recesses is a rectangular-parallelepiped-like depression defined by four side walls arranged in a circumferentially closed manner and a bottom wall. That is, in the support substrate, frames are formed to surround the respective recesses. Fuel electrodes of the power-generating elements A are embedded in the respective recesses.

13 Claims, 18 Drawing Sheets

STRUCTURE OF SOLID OXIDE FUEL CELL

The present invention relates to the structure of a fuel cell.

BACKGROUND OF THE INVENTION

Conventionally, there is known a structure of a solid oxide fuel cell having "an electrically insulating porous support substrate and having gas flow channels formed therein," "a plurality of power-generating elements provided on the surface of the support substrate at a plurality of positions, respectively, located apart from one another, each of the power-generating elements being a laminate of a fuel electrode, a solid electrolyte, and an air electrode," and "a single or a plurality of electrical connections having electron conductivity, provided between a pair of or pairs of adjacent power-generating elements, and adapted to electrically connect the inner electrode of one of the adjacent power-generating elements and the outer electrode of the other one of the adjacent power-generating elements" (refer to, for example, Japanese Patent Application Laid-Open (kokai) Nos. H08-106916 and 2008-226789). Such a configuration is also called "a segmented-in-series type."

The following description focuses on the shape of the support substrate. In the structure of a "segmented-in-series type" solid oxide fuel cell described in Japanese Patent Application Laid-Open (kokai) No. H08-106916, the support substrate assumes a cylindrical shape. On the surface (cylindrical surface) of the cylindrical support substrate, a plurality of "annular grooves" are formed at a plurality of axial positions for allowing fuel electrodes to be embedded therein, respectively (refer to FIG. 3). Thus, the outside diameter is reduced at the portions of the support substrate where the "annular grooves" are formed. Because of this, this structure can be said to be easily deformable when an external force is applied to the support substrate in a bending direction or a torsional direction.

Also, in the structure of a "segmented-in-series type" solid oxide fuel cell described in Japanese Patent Application Laid-Open (kokai) No. 2008-226789, the support substrate assumes the flat plate having a longitudinal direction. The flat-plate-like support substrate has, on each of its main surfaces (planes), "an elongated groove extending in the longitudinal direction and opening in the longitudinal direction" for allowing fuel electrodes, etc., to be embedded therein (refer to FIG. 3(*b*)). Thus, the thickness is, reduced at the portion of the support substrate where the "elongated groove" is formed.

Additionally, the "elongated groove" has side walls extending in the longitudinal direction at its opposite ends with respect to the width direction orthogonal to the longitudinal direction, but does not have side walls extending in the width direction at its opposite ends with respect to the longitudinal direction. That is, the "elongated groove" does not have a circumferentially closed side wall. Thus, the support substrate does not have a frame which surrounds the "elongated groove." Because of this, this structure can be said to be easily deformable when an external force is applied to the support substrate in a torsional direction. Thus, the structure of a "segmented-in-series type" fuel cell is desired to provide restraint of deformation of the support substrate when the support substrate is subjected to an external force.

SUMMARY OF THE INVENTION

An object of the present invention is to provide a structure of a "segmented-in-series type" fuel cell in which, when a support substrate is subjected to an external force, the support substrate is unlikely to be deformed.

A structure of a fuel cell according to the present invention comprises an electrically insulating flat-plate-like porous support substrate and having a gas flow channel formed therein; "a plurality of power-generating elements, each being a laminate of at least an inner electrode, a solid electrolyte, and an outer electrode," provided on a main surface of the flat-plate-like support substrate at a plurality of positions, respectively, located apart from one another; and a single or a plurality of electrical connections provided between a pair of or pairs of adjacent power-generating elements and adapted to electrically connect the inner electrode of one of the adjacent power-generating elements and the outer electrode of the other one of the adjacent power-generating elements. That is, this structure is the one of a "segmented-in-series type" fuel cell.

The structure of a fuel cell according to the present invention is characterized in that recesses are formed on the main surface of the flat-plate-like support substrate at the plurality of positions, respectively, each of the recesses having a bottom wall and a circumferentially closed side wall and that the inner electrodes of the power-generating elements are embedded (entirely) in the respective recesses.

Thus, in the structure of a "segmented-in-series type" fuel cell according to the present invention, each of the recesses for embedding the inner electrodes therein has a circumferentially closed side wall. In other words, in the support substrate, frames are formed for surrounding the respective recesses. Therefore, this structure can be said to be unlikely to be deformed when the support substrate is subjected to an external force.

Meanwhile, the planar shape of each of the recesses (a shape as viewed from a direction perpendicular to the main surface of the support substrate) is, for example, a rectangular shape, a square shape, a circular shape, or an elliptic shape. Preferably, the support substrate has a longitudinal direction and has the plurality of recesses disposed at predetermined intervals along the longitudinal direction. The inner electrodes and the outer electrodes may be air electrodes and fuel electrodes, respectively, or may be fuel electrodes and air electrodes, respectively. Each of the fuel electrodes may comprise a fuel-electrode active portion in contact with the solid electrolyte, and a remaining fuel-electrode current-collecting portion.

Also, the angle between the bottom wall and the side wall of each of the recesses may be 90° or may be, for example, 90° to 135°. Alternatively, in the case where the bottom wall and the side wall of each of the recesses intersect with each other along an arc, the ratio of the radius of the arc to the depth of the recess is, for example, 0.01 to 1. In the case where, as viewed from a direction perpendicular to the main surface of the support substrate, corners exist around each of the recesses, each of the corners may assume the form of an arc having a radius of 0.05 mm to 1.0 mm.

Preferably, in the above-mentioned structure of a fuel cell according to the present invention, the plurality of recesses are formed on each of opposite, parallel main surfaces of the flat-plate-like support substrate, and the inner electrodes of the power-generating elements are embedded in the respective recesses formed on the opposite main surfaces of the support substrate, whereby the plurality of power-generating elements are provided on the opposite main surfaces of the support substrate. Through employment of this configuration, as compared with the case where the plurality of power-generating elements are provided on only the main surface on one side of the support substrate, the number of the power-generating elements in the structure can be increased, whereby the power output of the fuel cell can be increased.

Preferably, in the above-mentioned structure of a fuel cell according to the present invention, the main surface of the support substrate and the outer surfaces of the inner electrodes constitute a single plane. Through employment of this configuration, in the case where, in order to provide a gas seal between the adjacent power-generating elements, "a dense layer not having electron conductivity" is provided in such a manner as to cover the main surface of the support substrate and the outer surfaces of the inner electrodes, the dense layer can be flattened. Thus, as compared with the case where the dense layer involves a level difference, there can be restrained the generation of crack in the dense layer which could otherwise result from stress concentration in association with the support substrate receiving an external force, or a like incident, whereby deterioration in the gas seal function of the dense layer can be restrained. The above-mentioned "dense layer not having electron conductivity" may be a layer formed by extending the dense solid electrolytes in the power-generating elements in such a manner as to cover the outer surfaces of the inner electrodes between the adjacent power-generating elements and the main surface of the support substrate.

DETAILED DESCRIPTION OF THE INVENTION (Configuration)

Figure 1:
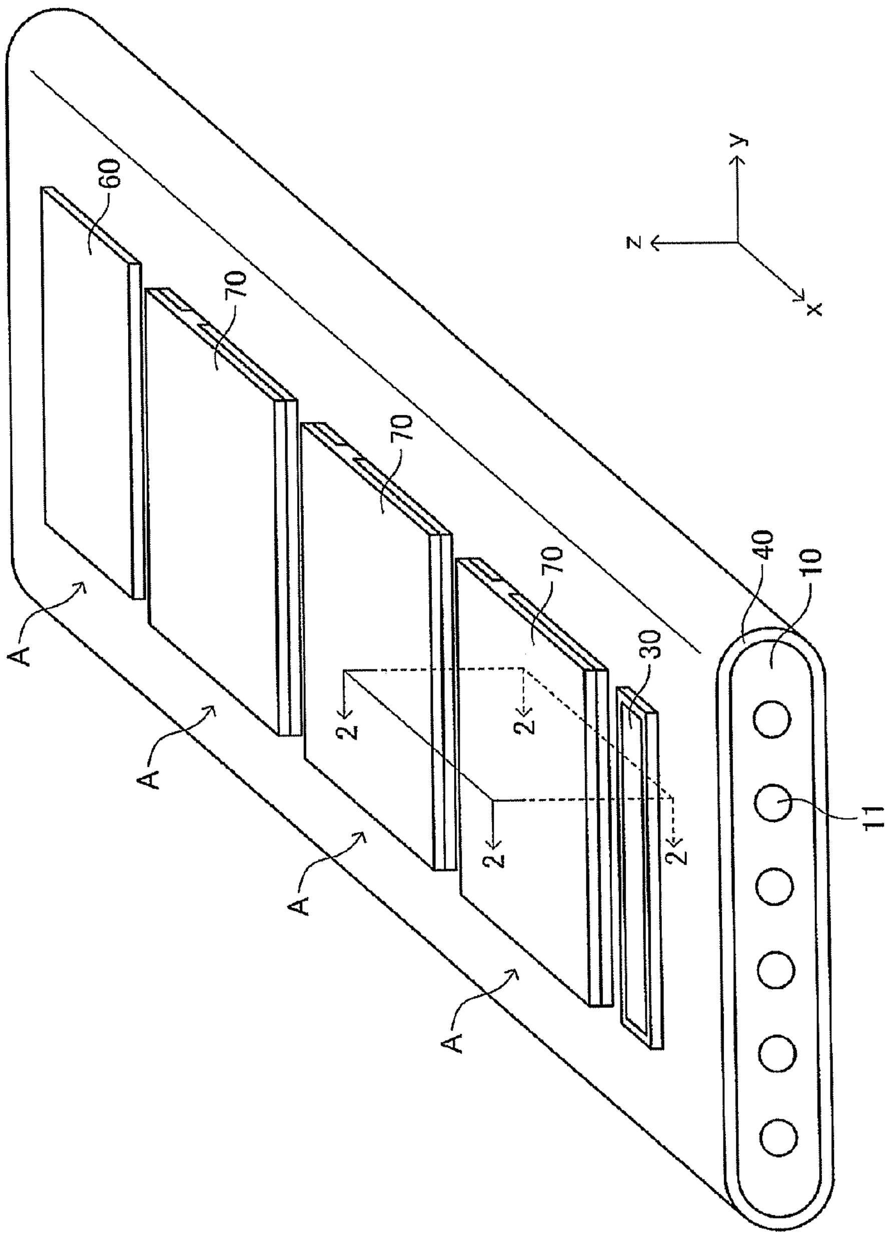
FIG. 1 Perspective view showing a structure of a fuel cell according to the present invention.

FIG. 1 shows a structure of a solid oxide fuel cell (SOFC) according to an embodiment of the present invention. The SOFC structure has a configuration called a "segmented-in-series type" in which, on each of the upper and lower surfaces (opposite main surfaces (planes) parallel to each other) of a flat-plate-like support substrate 10 having a longitudinal direction (an x-axis direction), a plurality of (in the present embodiment, four) power-generating elements A having the same shape and connected electrically in series are disposed at predetermined intervals along the longitudinal direction.

Figure 2:
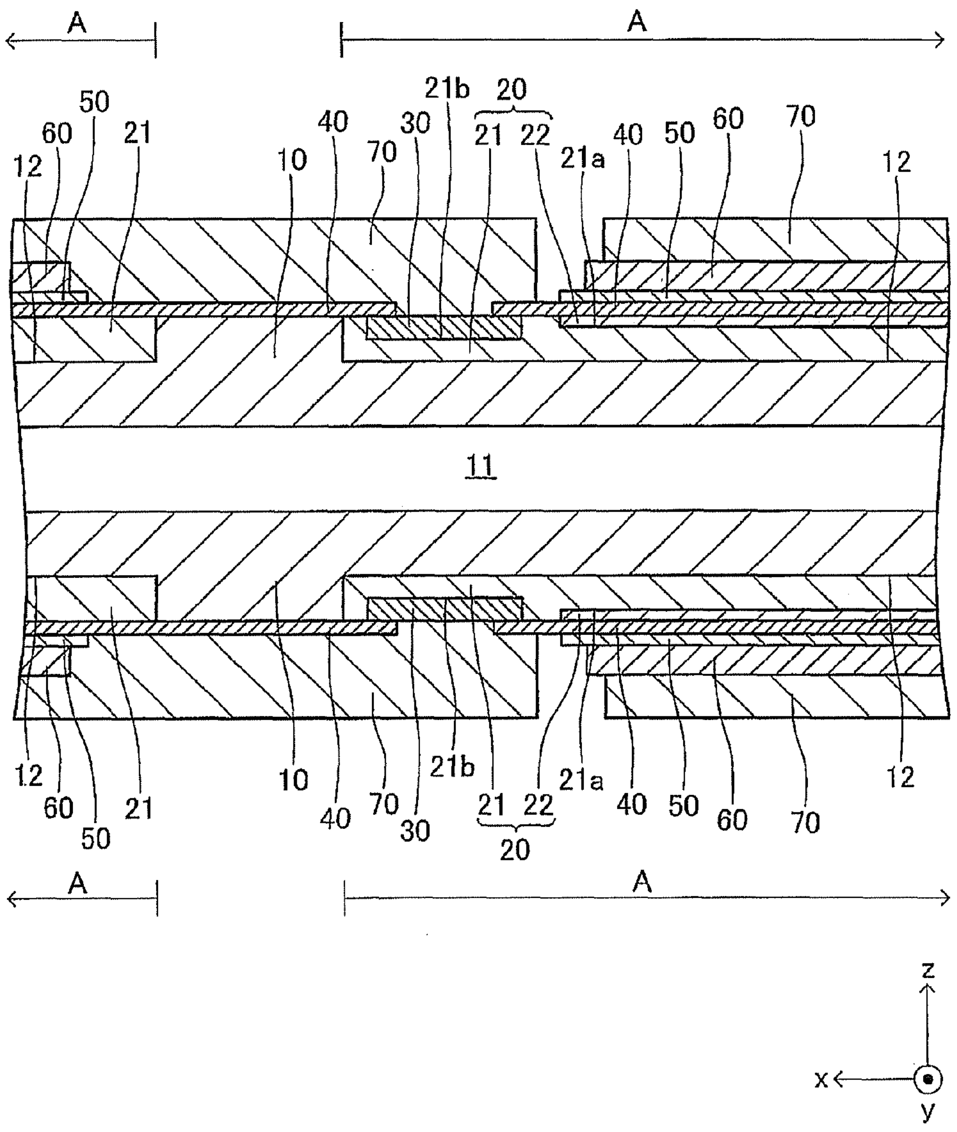
FIG. 2 Sectional view of the structure of the fuel cell taken along line 2-2 of FIG. 1.

As viewed from above, the entire SOFC structure has a rectangular shape with 5 cm to 50 cm on sides along the longitudinal direction and 1 cm to 10 cm on sides along a width direction (a y-axis direction) orthogonal to the longitudinal direction. The full thickness of the SOFC structure is 1 mm to 5 mm. The entire SOFC structure has a vertically symmetrical shape with respect to a plane which passes the center with respect to the thickness direction and is parallel to the main surfaces of the support substrate 10. The SOFC structure will be described in detail below with reference to, in addition to FIG. 1, FIG. 2, which is a fragmentary, sectional view of the SOFC structure taken along line 2-2 of FIG. 1. FIG. 2 is a fragmentary, sectional view showing the configurations (portions of the configurations) of a typical pair of adjacent power-generating elements A and a configuration between the power-generating elements A. The configurations between adjacent power-generating elements A of other pairs are similar to that shown in FIG. 2.

Figure 6:
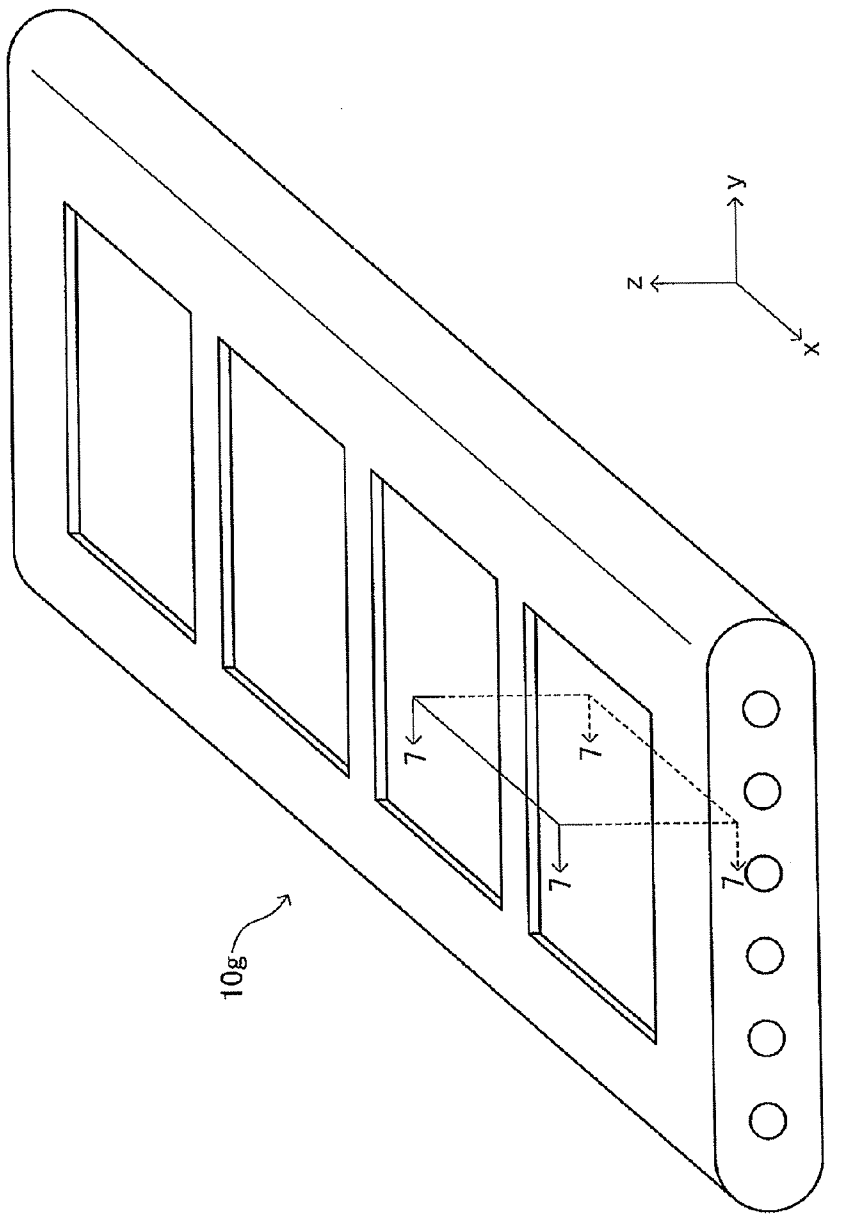
FIG. 6 Perspective view showing the support substrate shown in FIG. 1.

The support substrate 10 is a flat-plate-like sintered body of an electrically insulating porous material. As shown in FIG. 6, which will be described later, the support substrate 10 has a plurality of (in the present embodiment, six) fuel gas flow channels 11 (through holes) formed therein, extending in the longitudinal direction, and disposed at predetermined intervals along the width direction. In the present embodiment, each of recesses 12 is a rectangular-parallelepiped-like depression defined by a bottom wall of the material of the support substrate 10 and side walls (two side walls along the longitudinal direction and two side walls along the width direction) of the material of the support substrate 10 arranged in a circumferentially closed manner.

The support substrate 10 can be formed of, for example, CSZ (calcia-stabilized zirconia). Alternatively, the support substrate 10 may be formed of NiO (nickel oxide) and YSZ (8YSZ) (yttria-stabilized zirconia); NiO (nickel oxide) and $Y_2O_3$ (yttria); or MgO (magnesium oxide) and $MgAl_2O_4$ (magnesia alumina spinel).

The support substrate 10 can contain "a transition metal oxide or a transition metal" and an insulating ceramic. NiO (nickel oxide) or Ni (nickel) is preferred as "a transition metal oxide or a transition metal." A transition metal can function as a catalyst for accelerating a reforming reaction of fuel gas (a reforming catalyst for hydrocarbon gas).

A preferred insulating ceramic is MgO (magnesium oxide) or a "mixture of $MgAl_2O_4$ (magnesia alumina spinel) and MgO (magnesium oxide)." Also, CSZ (calcia-stabilized zirconia), YSZ (8YSZ) (yttria-stabilized zirconia), or $Y_2O_3$ (yttria) may be used as an insulating ceramic.

In this manner, by means of the support substrate 10 containing "a transition metal oxide or a transition metal," in a process in which gas that contains a residual unreformed gas component is supplied from the fuel gas flow channels 11 to the fuel electrodes through a large number of pores in the porous support substrate 10, the above-mentioned catalytic action can accelerate reforming of the residual unreformed gas component. Additionally, by means of the support substrate 10 containing an insulating ceramic, an insulating property of the support substrate 10 can be ensured. As a result, the insulation between the adjacent fuel electrodes can be ensured.

The thickness of the support substrate 10 is 1 mm to 5 mm. In view that the structure has a vertically symmetrical shape, for simplification of description, only the upper configuration of the support substrate 10 will be described. The lower configuration of the support substrate 10 is similar to the upper configuration.

Figure 3:
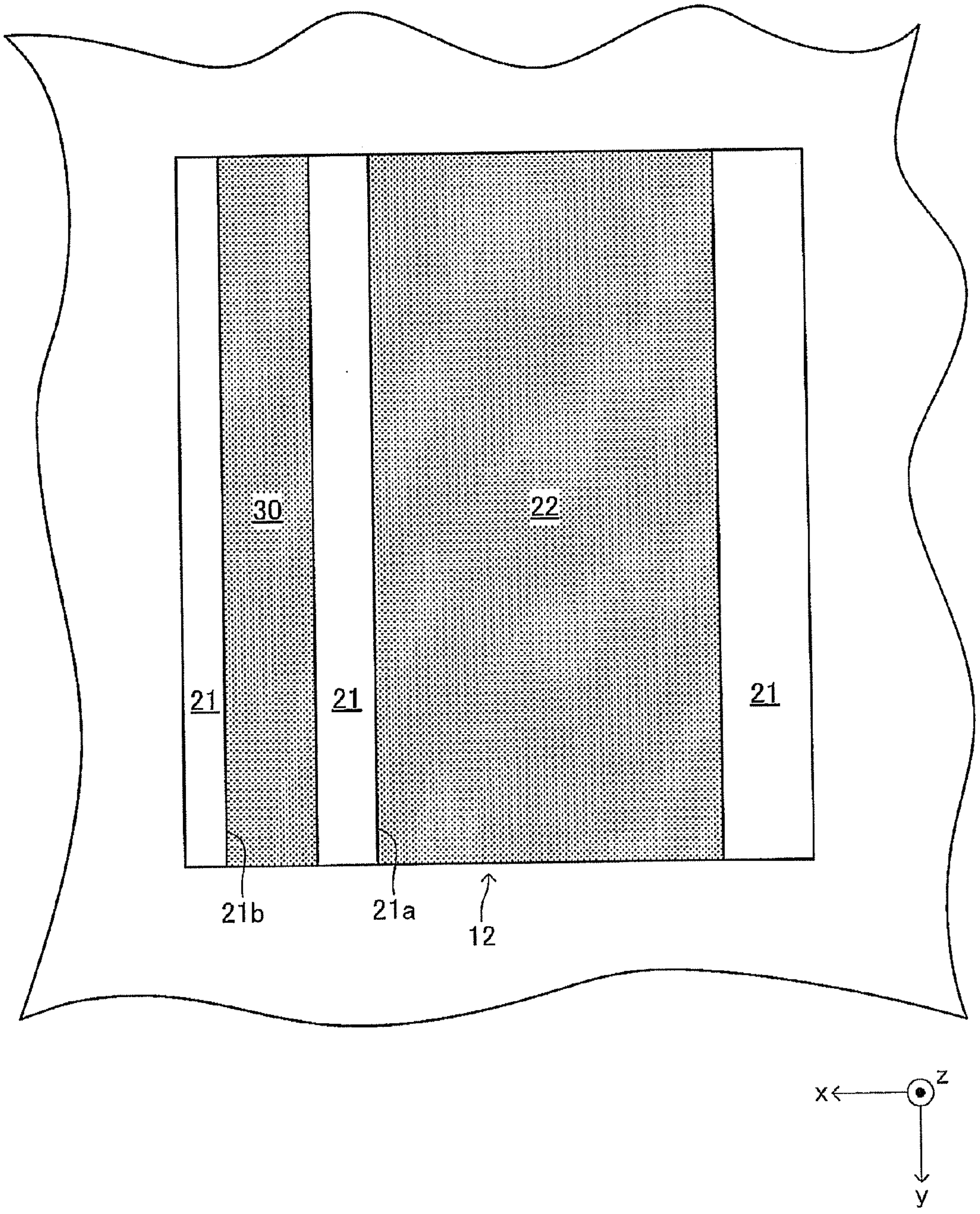
FIG. 3 Plan view showing a fuel electrode and an interconnector embedded in a recess of a support substrate shown in FIG. 1.

As shown in FIGS. 2 and 3, fuel-electrode current-collecting portions 21 are embedded entirely in (filled into) the recesses 12 formed on the upper surface (the upper main surface) of the support substrate 10. Thus, each of the fuel-electrode current-collecting portions 21 assumes the form of a rectangular parallelepiped. Each of the fuel-electrode current-collecting portions 21 has a recess 21*a* formed on its upper surface (outer surface). Each of the recesses 21*a* is a rectangular-parallelepiped-like depression defined by a bottom wall of the material of the fuel-electrode current-collecting portion 21 and side walls (two side walls along the longitudinal direction and two side walls along the width direction) arranged in a circumferentially closed manner. Among the side walls arranged in a circumferentially closed manner, the two side walls along the longitudinal direction are of the material of the support substrate 10, and the two side walls along the width direction are of the material of the fuel-electrode current-collecting portion 21.

Fuel-electrode active portions 22 are embedded entirely in (filled into) the respective recesses 21*a*. Thus, each of the fuel-electrode active portions 22 assumes the form of a rectangular parallelepiped. The fuel-electrode current-collecting portion 21 and the fuel-electrode active portion 22 constitute the fuel electrode 20. The fuel electrode 20 (the fuel-electrode current-collecting portion 21+the fuel-electrode active portion 22) is a sintered body of a porous material having electron conductivity. Two side surfaces along the width direction and the bottom surface of each of the fuel-electrode active portions 22 are, within the recess 21*a*, in contact with the fuel-electrode current-collecting portion 21.

On the upper surface (outer surface) of each of the fuel-electrode current-collecting portions 21, a recess 21*b* is formed in a region other than the recess 21*a*. Each of the recesses 21*b* is a rectangular-parallelepiped-like depression defined by a bottom wall of the material of the fuel-electrode current-collecting portion 21 and side walls (two side walls along the longitudinal direction and two side walls along the width direction) arranged in a circumferentially closed manner. Among the side walls arranged in a circumferentially closed manner, the two side walls along the longitudinal direction are of the material of the support substrate 10, and the two side walls along the width direction are of the material of the fuel-electrode current-collecting portion 21.

Interconnectors 30 are embedded in (filled into) the respective recesses 21*b*. Thus, each of the interconnectors 30 assumes the form of a rectangular parallelepiped. The interconnector 30 is a sintered body of a dense material having electron conductivity. Two side surfaces along the width direction and the bottom surface of each of the interconnectors 30 are, within the recess 21*b*, in contact with the fuel-electrode current-collecting portion 21.

The upper surfaces (outer surfaces) of the fuel electrodes 20 (the fuel-electrode current-collecting portions 21 and the fuel-electrode active portions 22), the upper surfaces (outer surfaces) of the interconnectors 30, and the main surface of the support substrate 10 constitute a single plane (the same plane as the main surface of the support substrate 10 in the case where the recesses 12 are not formed). That is, no level difference exists among the upper surfaces of the fuel electrodes 20, the upper surfaces of the interconnectors 30, and the main surface of the support substrate 10.

The fuel-electrode active portion 22 can be formed of, for example, NiO (nickel oxide) and YSZ (8YSZ) (yttria-stabilized zirconia). Alternatively, the fuel-electrode active portion 22 may be formed of NiO (nickel oxide) and GDC (gadolinium-doped ceria). The fuel-electrode current-collecting portion 21 can be formed of, for example, NiO (nickel oxide) and YSZ (8YSZ) (yttria-stabilized zirconia). Alternatively, the fuel-electrode current-collecting portion 21 may be formed of NiO (nickel oxide) and $Y_2O_3$ (yttria), or NiO (nickel oxide) and CSZ (calcis-stabilized zirconia). The thickness of the fuel-electrode active portion 22 is 5 μm to 30 μm, and the thickness of the fuel-electrode current-collecting portion 21 (i.e., the depth of the recess 12) is 50 μm to 500 μm.

In this manner, the fuel-electrode current-collecting portion 21 contains an electron conductive substance. The fuel-electrode active portion 22 contains an electron conductive substance and a substance having oxygen ion conductivity. "The ratio of the volume of a substance having oxygen ion conductivity to the total volume excluding pores" in the fuel-electrode active portion 22 is higher than "the ratio of the volume of a substance having oxygen ion conductivity to the total volume excluding pores" in the fuel-electrode current-collecting portion 21.

The interconnector 30 is formed of, for example, $LaCrO_3$ (lanthanum chromite). Alternatively, the interconnector 30 may be formed of, (Sr, La)$TiO_3$ (strontium titanate). The thickness of the interconnector 30 is 10 μm to 100 μm.

A solid electrolyte film 40 covers the entire longitudinally extending outer surface of an assembly of the support substrate 10 in which the fuel electrodes 20 and the interconnectors 30 are embedded in the respective recesses 12, except for surface regions corresponding to longitudinally central portions of the interconnectors 30. The solid electrolyte film 40 is a sintered body of a dense material having ion conductivity and not having electron conductivity. The solid electrolyte film 40 can be formed of, for example, YSZ (8YSZ) (yttria-stabilized zirconia). Alternatively, the solid electrolyte film 40 may be formed of LSGM (lanthanum gallate). The thickness of the solid electrolyte film 40 is 3 μm to 50 μm.

That is, a dense film composed of the interconnectors 30 and the solid electrolyte film 40 covers the entire longitudinally extending outer surface of the assembly of the support substrate 10 in which the fuel electrodes 20 are embedded in the respective recesses 12. This dense film performs a gas seal function of preventing the mixing of fuel gas flowing through a space on the inside of the dense layer and air flowing through a space on the outside of the dense layer.

As shown in FIG. 2, in the present embodiment, the solid electrolyte film 40 covers the upper surfaces of the fuel electrodes 20, longitudinally opposite end portions of the upper surfaces of the interconnectors 30, and the main surface of the support substrate 10. As mentioned above, no level difference exists among the upper surfaces of the fuel electrodes 20, the upper surfaces of the interconnectors 30, and the main surface of the support substrate 10. Thus, the solid electrolyte film 40 is flattened. As a result, as compared with the case where the solid electrolyte film 40 involves a level difference, there can be restrained the generation of crack in the solid electrolyte film 40 which could otherwise result from stress concentration, whereby deterioration in the gas seal function of the solid electrolyte film 40 can be restrained.

Air electrodes 60 are formed, via respective reaction prevention films 50, on the respective upper surfaces of those portions of the solid electrolyte film 40 which are in contact with the fuel-electrode active portions 22. The reaction prevention film 50 is a sintered body of a dense material, and the air electrode 60 is a sintered body of a porous material having electron conductivity. As viewed from above, the reaction prevention film 50 and the air electrode 60 have a rectangular shape substantially similar to that of the fuel-electrode active portion 22.

The reaction prevention film 50 can be formed of, for example, GDC=(Ce, Gd)$O_2$ (gadolinium-doped ceria). The thickness of the reaction prevention film 50 is 3 μm to 50 μm. The air electrode 60 can be formed of, for example, LSCF=(La, Sr)(Co, Fe)$O_3$ (lanthanum strontium cobalt ferrite). Alternatively, the air electrode 60 may be formed of LSF=(La, Sr)$FeO_3$ (lanthanum strontium ferrite), LNF=La(Ni, Fe)$O_3$ (lanthanum nickel ferrite), LSC=(La, Sr)$CoO_3$ (lanthanum strontium cobaltite), or the like. Also, the air electrode 60 may be of two layers consisting of a first layer (inner layer) of LSCF and a second layer (outer layer) of LSC. The thickness of the air electrode 60 is 10 μm to 100 μm.

The reason for using the reaction prevention film 50 as an intervening film is to restrain the occurrence of the phenomenon that, in the course of fabrication or operation of an SOFC, YSZ in the solid electrolyte film 40 and Sr in the air electrode 60 react with each other to form a reaction film having a high electric resistance at the interface between the solid electrolyte film 40 and the air electrode 60.

A laminate of the fuel electrode 20, the solid electrolyte film 40, the reaction prevention film 50, and the air electrode 60 corresponds to the "power-generating element A" (see FIG. 2). That is, on the upper surface of the support substrate 10, a plurality of (in the present embodiment, four) the power-generating elements A are disposed at predetermined intervals along the longitudinal direction.

In each pair of the adjacent power-generating elements A, an air-electrode current-collecting film 70 is formed on the upper surfaces of the air electrode 60, the solid electrolyte film 40, and the interconnector 30 in such a manner as to bridge the air electrode 60 of one (in FIG. 2, the left) power-generating element A and the interconnector 30 of the other (in FIG. 2, the right) power-generating element A. The air-electrode current-collecting film 70 is a sintered body of a porous material having electron conductivity. As viewed from above, the air-electrode current-collecting film 70 has a rectangular shape.

The air-electrode current-collecting film 70 can be formed of, for example, LSCF=(La, Sr)(Co, Fe)$O_3$ (lanthanum strontium cobalt ferrite). Alternatively, the air-electrode current-collecting film 70 may be formed of LSC=(La, Sr)$CoO_3$ (lanthanum strontium cobaltite). Alternatively, the air-electrode current-collecting film 70 may be formed of Ag (silver) or Ag—Pd (silver-palladium alloy). The thickness of the air-electrode current-collecting film 70 is 50 μm to 500 μm.

In this manner, through formation of the air-electrode current-collecting films 70, in each pair of the adjacent power-generating elements A, the air electrode 60 of one (in FIG. 2, the left) power-generating element A and the fuel electrode 20 (particularly, the fuel-electrode current-collecting portion 21) of the other (in FIG. 2, the right) power-generating element A are electrically connected to each other via "the air-electrode current-collecting film 70 and the interconnector 30" having electron conductivity. As a result, a plurality of (in the present embodiment, four) power-generating elements A disposed on the upper surface of the support substrate 10 are connected electrically in series. "The air-electrode current-collecting film 70 and the interconnector 30" having electron conductivity collectively correspond to the aforementioned "electrical connection."

The interconnector 30 corresponds to the aforementioned "first portion formed of a dense material" of the "electrical connection" and has a porosity of 10% or less. The air-electrode current-collecting film 70 corresponds to the aforementioned "second portion formed of a porous material" of the "electrical connection" and has a porosity of 20% to 60%.

Figure 4:
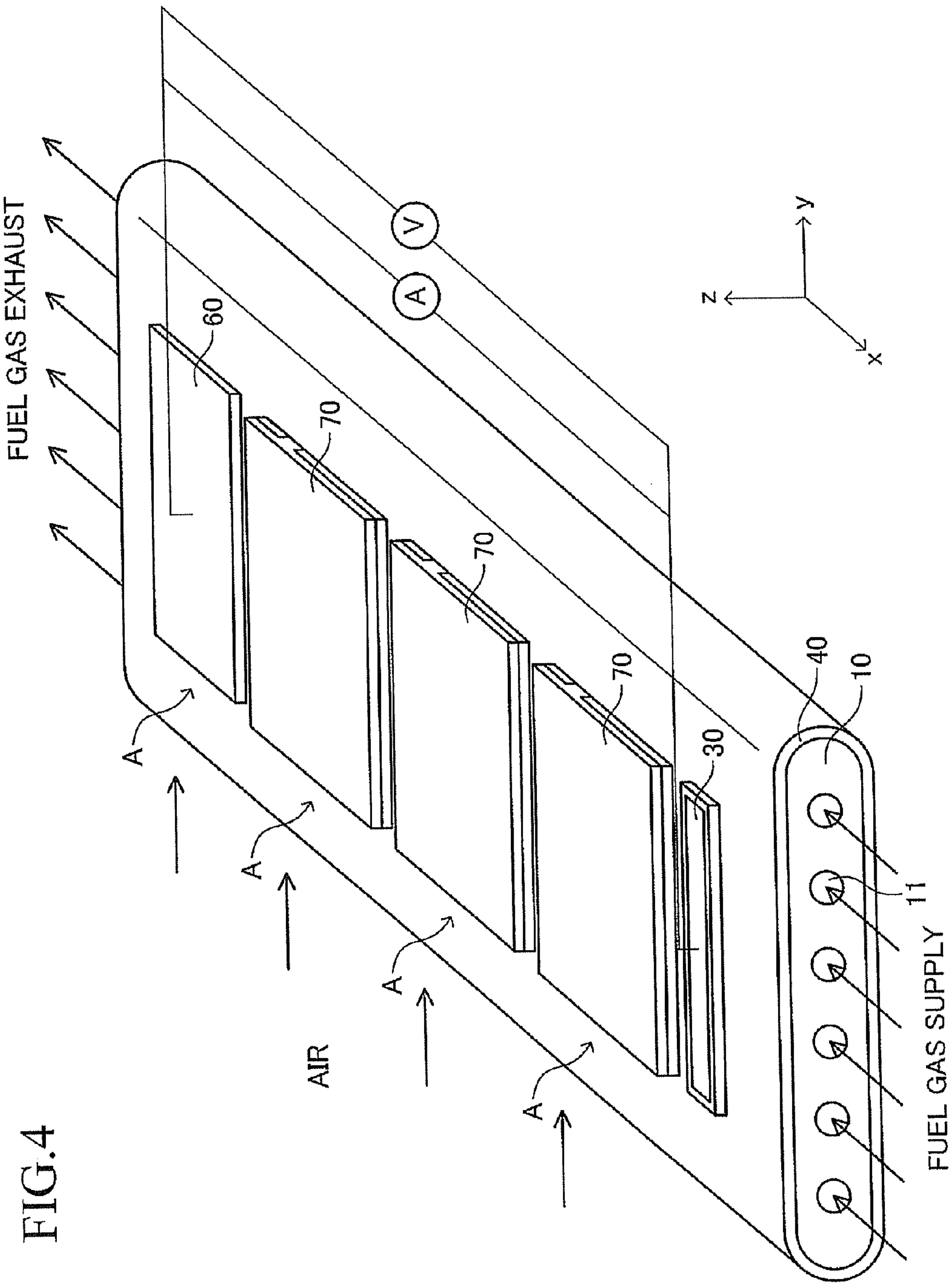
FIG. 4 View for explaining the operating condition of the structure of the fuel cell shown in FIG. 1.

In the above-described "segmented-in-series type" SOFC structure, as shown in FIG. 4, fuel gas (hydrogen gas or the like) is run through the fuel gas flow channels 11 of the support substrate 10, and the upper and lower surfaces of the support substrate 10 (particularly the air-electrode current-collecting films 70) are exposed to "gas containing oxygen" (air or the like) (alternatively, gas containing oxygen is run along the upper and lower surfaces of the support substrate 10), whereby electromotive force is generated according to the difference in partial pressure of oxygen between the opposite surfaces of the solid electrolyte film 40. Furthermore, when this structure is connected to an external load, the chemical reactions expressed by the following Formulae (1) and (2) occur, and current flows (power generating condition).

$$(\tfrac{1}{2})\cdot O_2+2e^- \rightarrow O^{2-} \text{ (at the air electrode 60)} \quad (1)$$

$$H_2+O^{2-} \rightarrow H_2O+2e^- \text{ (at the fuel electrode 20)} \quad (2)$$

Figure 5:
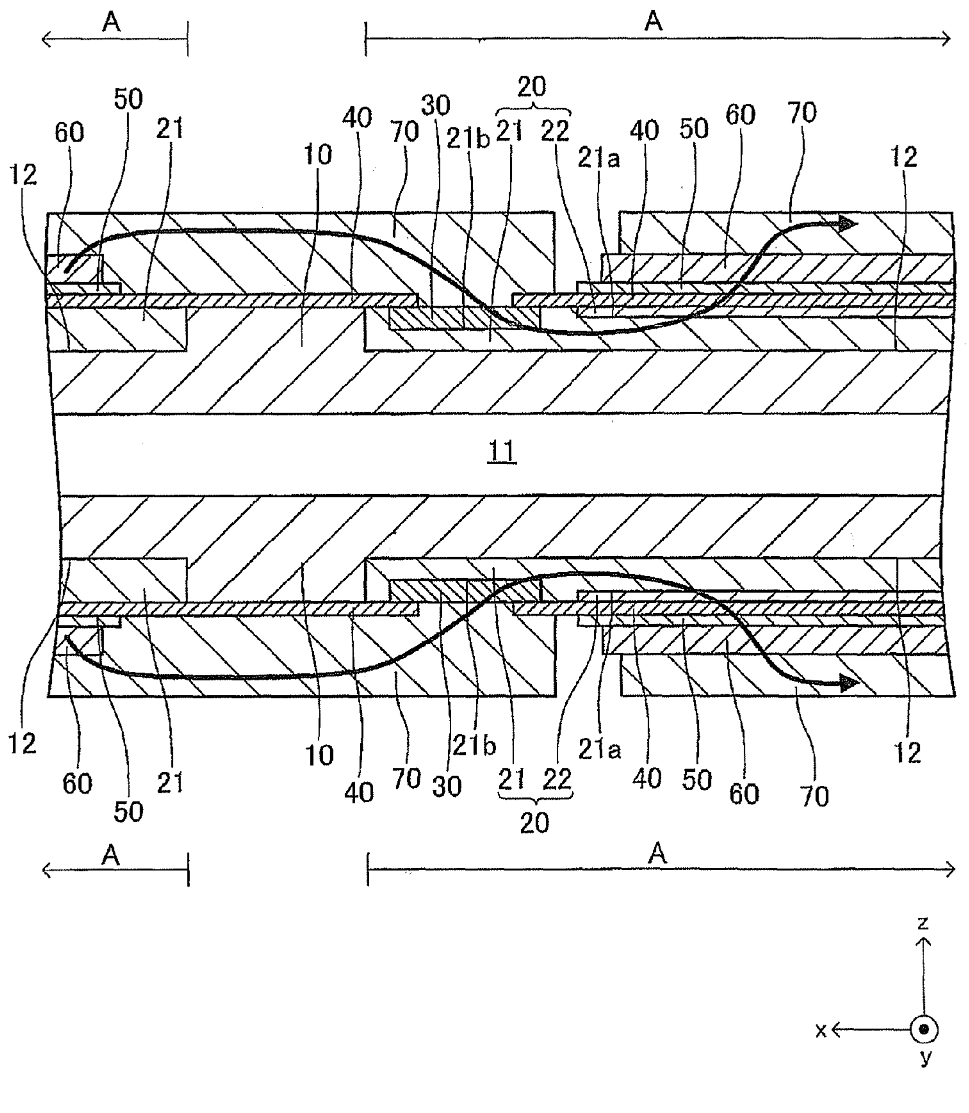
FIG. 5 View for explaining the flow of current in the operating condition of the structure of the fuel cell shown in FIG. 1.

In the power generating condition, as shown in FIG. 5, in each pair of the adjacent power-generating elements A, current flows as indicated by the arrows. As a result, power is output from the entire SOFC structure as shown in FIG. 4 (specifically, via the interconnector 30 of the power-generating element A located on the nearest side in FIG. 4 and the air electrode 60 of the power-generating element A located on the farthest side in FIG. 4).

(Manufacturing Method)

Next, an example method for manufacturing the "segmented-in-series type" SOFC structure shown in FIG. 1 will be briefly described with reference to FIGS. 6 to 14. In FIGS. 6 to 14, the trailing letter "g" of reference numerals of members indicates that the members are "green."

First, a green body 10*g* of the support substrate having a shape shown in FIG. 6 is manufactured. The green body 10*g* of the support substrate can be manufactured, for example, by use of a slurry prepared by adding a binder, etc., to a powder of a material (e.g., CSZ) of the support substrate 10 and through utilization of extrusion, machining, and like working processes. The description of the method continues below with reference to FIGS. 7 to 14, which are fragmentary sectional views taken along line 7-7 of FIG. 6.

Figure 7:
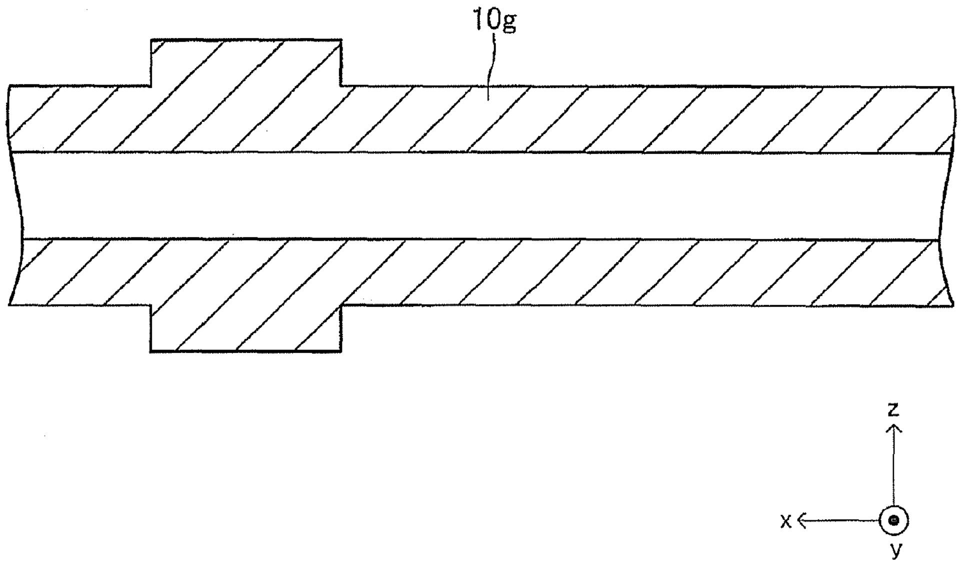
FIG. 7 Sectional view corresponding to FIG. 2 as viewed at the first stage in the process of manufacturing the structure of the fuel cell shown in FIG. 1.
Figure 8:
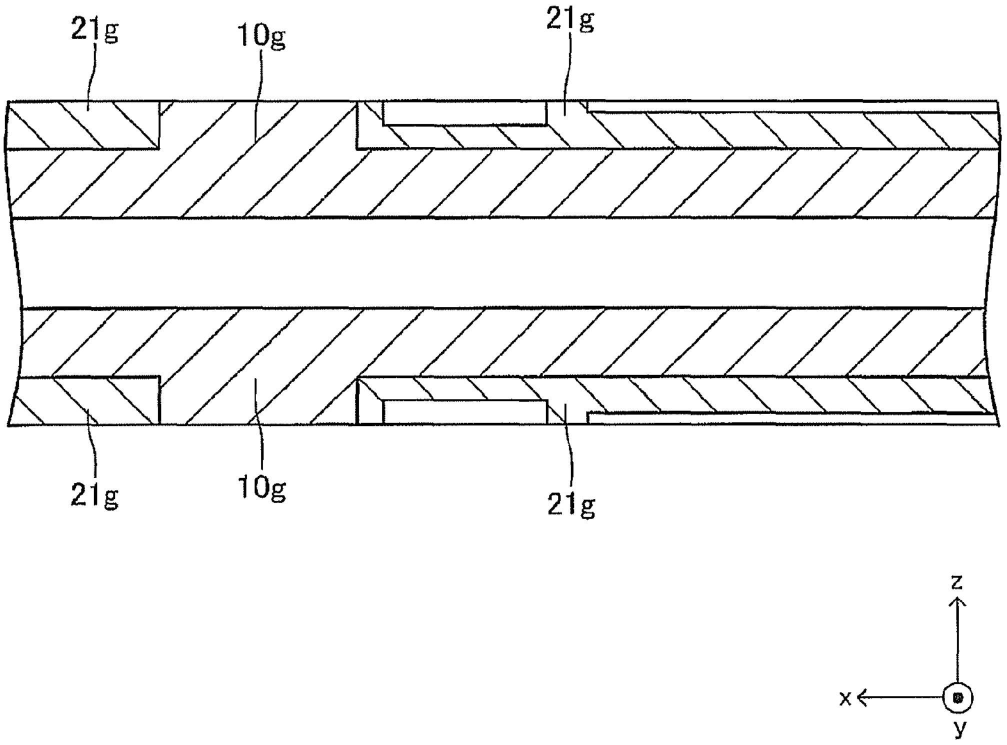
FIG. 8 Sectional view corresponding to FIG. 2 as viewed at the second stage in the process of manufacturing the structure of the fuel cell shown in FIG. 1.
Figure 9:
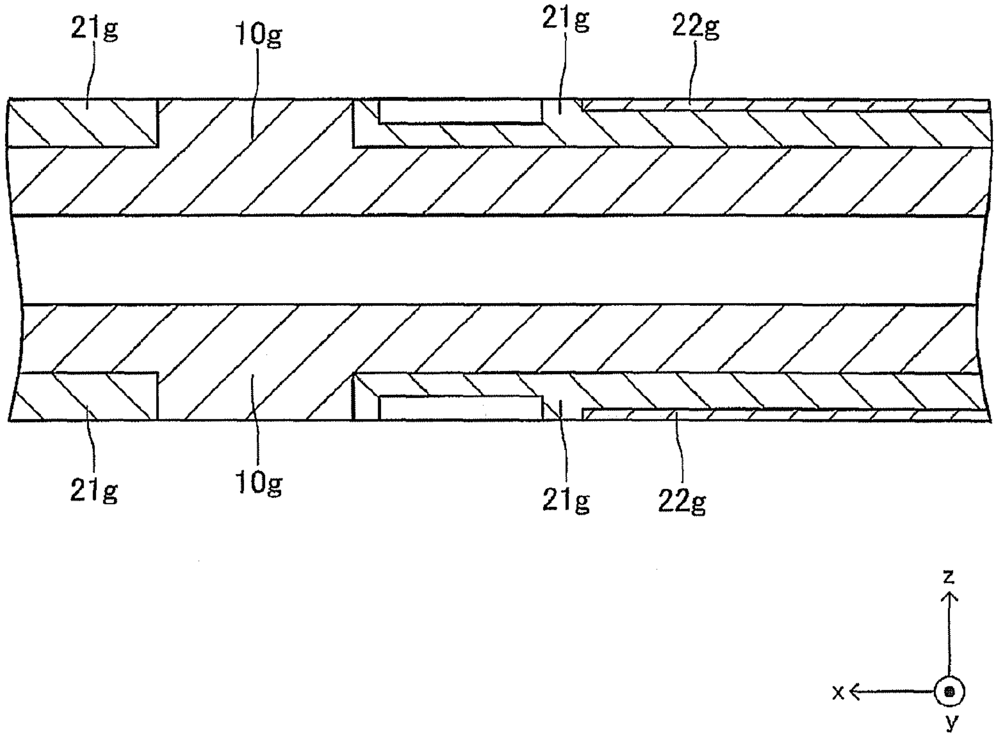
FIG. 9 Sectional view corresponding to FIG. 2 as viewed at the third stage in the process of manufacturing the structure of the fuel cell shown in FIG. 1.

After the green body 10*g* of the support substrate is manufactured as shown in FIG. 7, as shown in FIG. 8, green bodies 21*g* of the fuel-electrode current-collecting portions are formed in an embedded manner in respective recesses formed on the upper and lower surfaces of the green body 10*g* of the support substrate. Next, as shown in FIG. 9, green bodies 22*g* of the fuel-electrode active portions are formed in an embedded manner in the respective recesses formed on the outer surfaces of the green bodies 21*g* of the fuel-electrode current-collecting portions. The green bodies 21*g* of the fuel-electrode current-collecting portions and the fuel-electrode active portions 22*g* are formed in an embedded manner, for example, by use of a slurry prepared by adding a binder, etc., to a powder of a material (e.g., Ni and YSZ) of the fuel electrode 20 and through utilization of a printing process, or the like.

Figure 10:
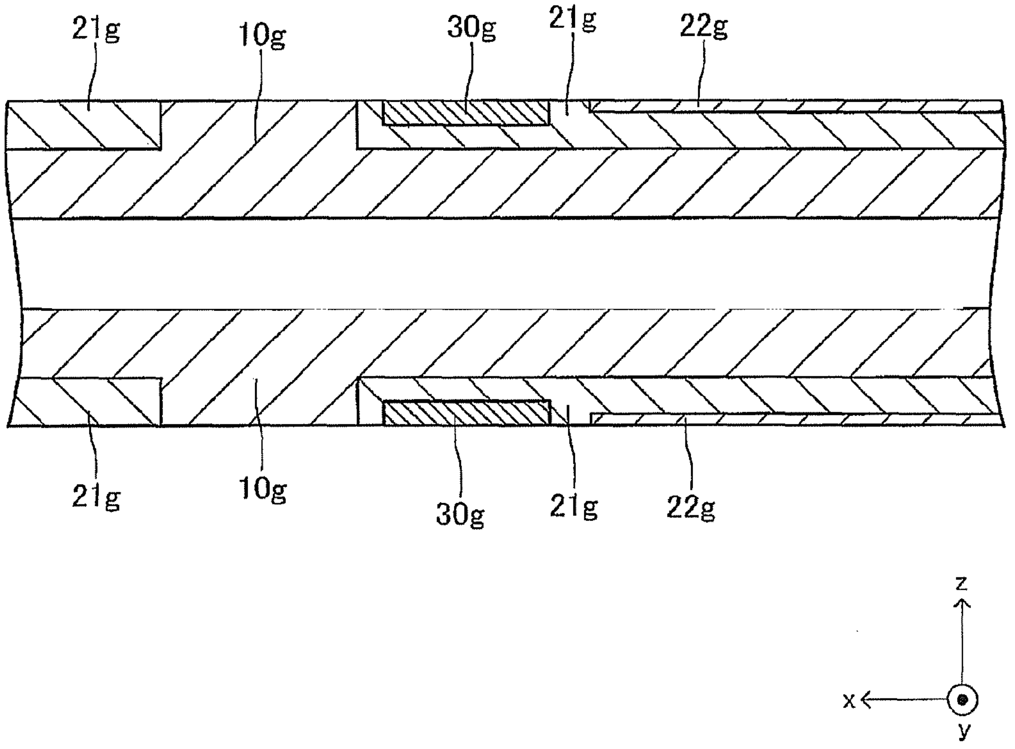
FIG. 10 Sectional view corresponding to FIG. 2 as viewed at the fourth stage in the process of manufacturing the structure of the fuel cell shown in FIG. 1.

Subsequently, as shown in FIG. 10, green bodies 30*g* of the interconnectors are formed in an embedded manner in respective recesses which are formed on the outer surfaces of the green bodies 21*g* of the fuel-electrode current-collecting portions in "regions other than those where the green bodies 22*g* of the fuel-electrode active portions are embedded." The green bodies 30*g* of the interconnectors are formed in an embedded manner, for example, by use of a slurry prepared by adding a binder, etc., to a power of a material (e.g., $LaCrO_3$) of the interconnector 30 and through utilization of a printing process or the like.

Figure 11:
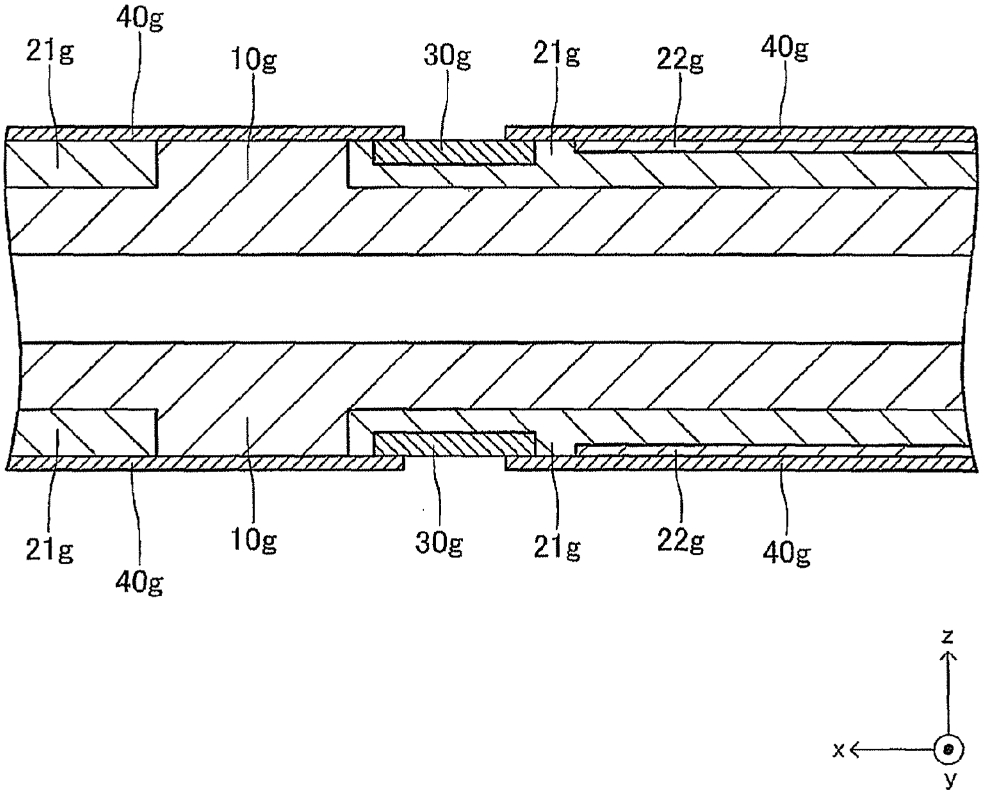
FIG. 11 Sectional view corresponding to FIG. 2 as viewed at the fifth stage in the process of manufacturing the structure of the fuel cell shown in FIG. 1.

Next, as shown in FIG. 11, a green film 40*g* of the solid electrolyte film is formed on the entire longitudinally extending outer surface of an assembly of the green body 10*g* of the support substrate in which a plurality of the green bodies (21*g*+22*g*) of the fuel electrodes and a plurality of the green bodies 30*g* of the interconnectors are formed in an embedded manner, except for surface regions corresponding to longitudinally central portions of the green bodies 30*g* of the interconnectors. The green film 40*g* of the solid electrolyte film is formed, for example, by use of a slurry prepared by adding a binder, etc., to a powder of a material (e.g., YSZ) of the solid electrolyte film 40 and through utilization of a printing process, a dipping process, or the like.

Figure 12:
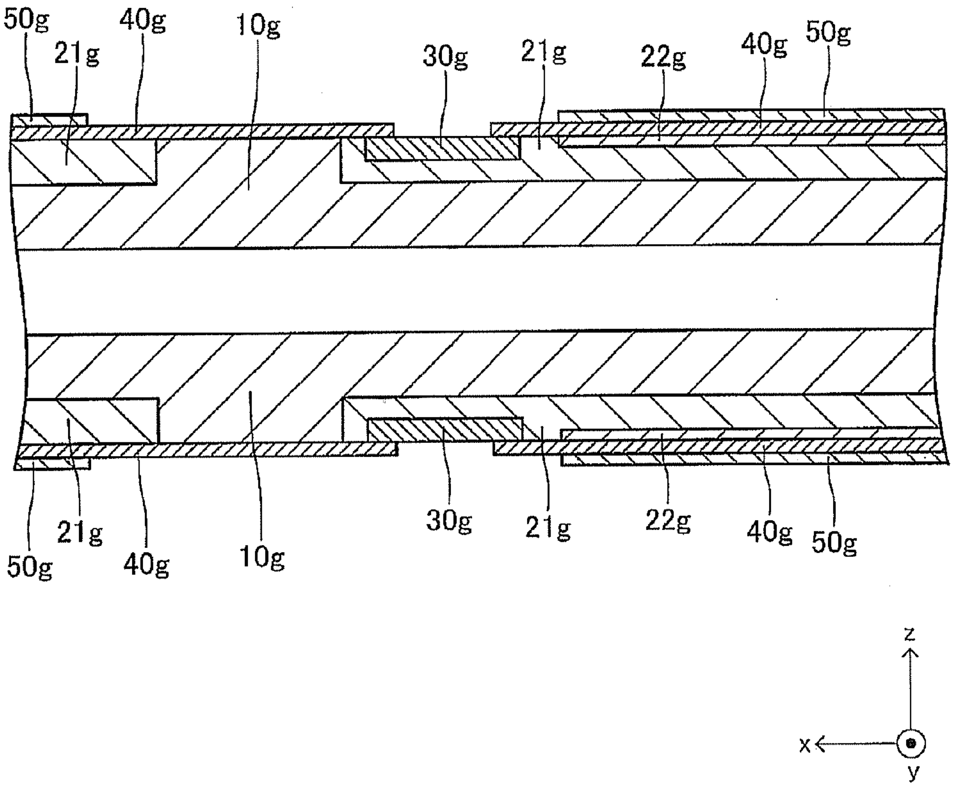
FIG. 12 Sectional view corresponding to FIG. 2 as viewed at the sixth stage in the process of manufacturing the structure of the fuel cell shown in FIG. 1.

Next, as shown in FIG. 12, green films 50*g* of the reaction prevention films are formed on the respective upper surfaces of those portions of the green body 40*g* of the solid electrolyte film which are in contact with the green bodies 22*g* of the fuel electrodes. The green films 50*g* of the reaction prevention films are formed, for example, by use of a slurry prepared by adding a binder, etc., to a powder of a material (e.g., GDC) of the reaction prevention film 50 and through utilization of a printing process or the like.

Then, the green body 10*g* of the support substrate on which such various green films are formed is sintered at 1,500° C. for three hours in air. By this procedure, there is yielded a structure in a state in which the air electrodes 60 and the air-electrode current-collecting films 70 are removed from the SOFC structure shown in FIG. 1.

Figure 13:
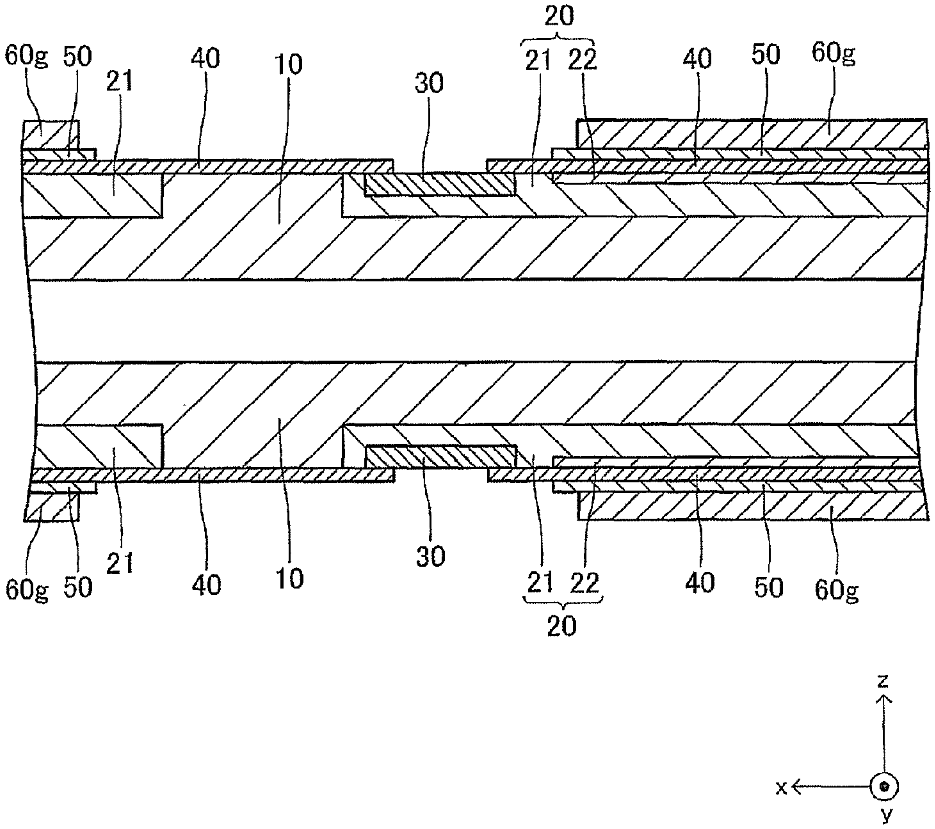
FIG. 13 Sectional view corresponding to FIG. 2 as viewed at the seventh stage in the process of manufacturing the structure of the fuel cell shown in FIG. 1.

Next, as shown in FIG. 13, green films 60*g* of the air electrodes are formed on the outer surfaces of the reaction prevention films 50, respectively. The green films 60*g* of the air electrodes are formed, for example, by use of a slurry prepared by adding a binder, etc., to a powder of a material (e.g., LSCF) of the air electrode 60 and through utilization of a printing process or the like.

Figure 14:
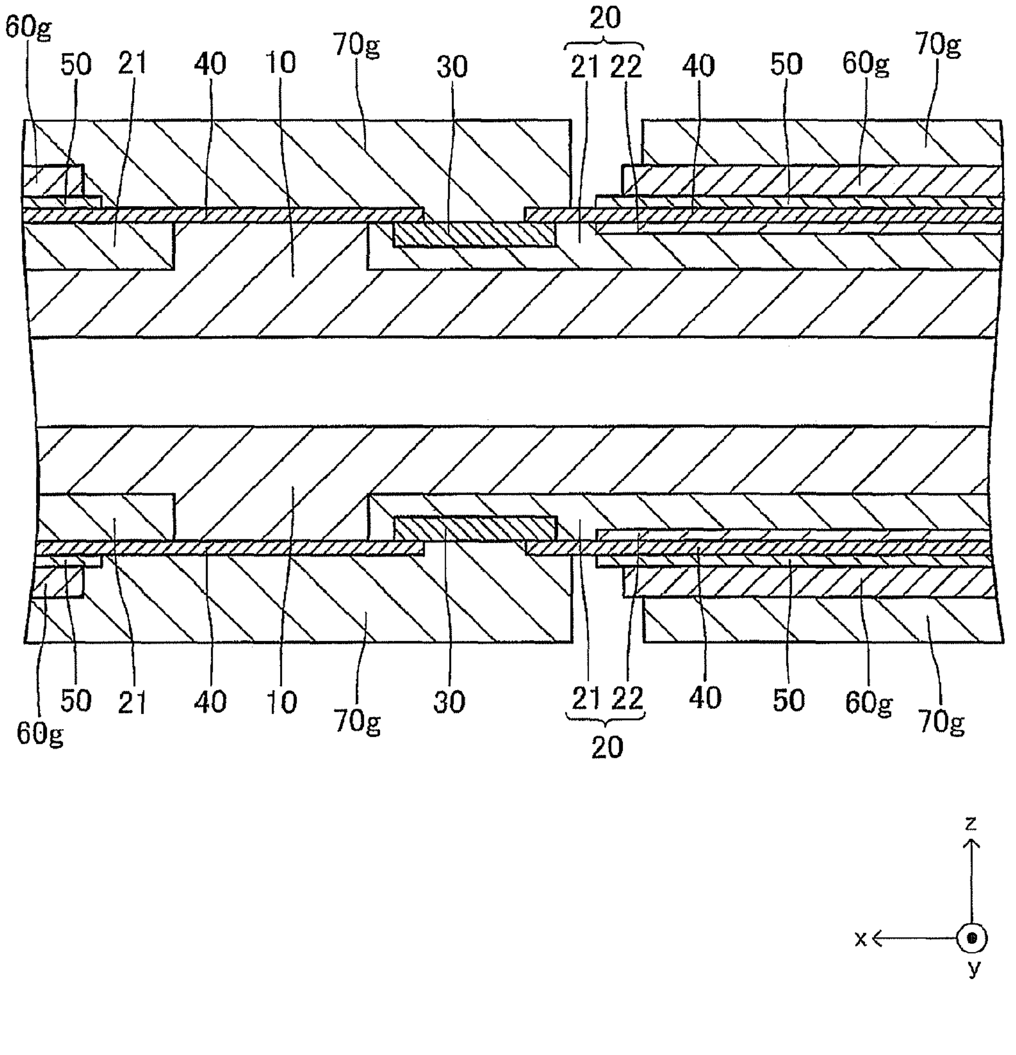
FIG. 14 Sectional view corresponding to FIG. 2 as viewed at the eighth stage in the process of manufacturing the structure of the fuel cell shown in FIG. 1.

Next, as shown in FIG. 14, in each pair of the adjacent power-generating elements, a green film 70*g* of the air-electrode current-collecting film is formed on the upper surface of the green film 60*g* of the air electrode, the upper surface of the solid electrolyte film 40, and the upper surface of the interconnector 30 in such a manner as to bridge the green film 60*g* of the air electrode of one power-generating element and the interconnector 30 of the other power-generating element. The green films 70*g* of the air-electrode current-collecting films are formed, for example, by use of a slurry prepared by adding a binder, etc., to a powder of a material (e.g., LSCF) of the air-electrode current-collecting film 70 and through utilization of a printing process or the like.

Then, the support substrate 10 in a state in which the green films 60*g* and 70*g* are thus formed is sintered at 1,050° C. for three hours in air. By this procedure, the SOFC structure shown in FIG. 1 is yielded. So far, an example method for manufacturing the SOFC structure shown in FIG. 1 has been described.

(Actions and Effects)

As described above, in the "segmented-in-series type" SOFC structure according to the above embodiment of the present invention, each of a plurality of the recesses 12 formed on the upper and lower surfaces of the support substrate 10 and adapted to allow the respective fuel electrodes 20 to be embedded therein has side walls of the material of the support substrate 10 arranged in a circumferentially closed manner. In other words, in the support substrate 10, frames which surround the respective recesses 12 are formed. Thus, this structure is unlikely to be deformed when the support substrate 10 is subjected to an external force.

In a state in which members, such as the fuel electrodes 20 and the interconnectors 30, are tightly filled or embedded into the respective recesses 12 of the support substrate 10, the support substrate 10 and the embedded members are cosintered. Thus, there is yielded a sintered body having high bonding strength between members and high reliability.

Also, each of the interconnectors 30 is embedded in the recess 21*b* formed on the outer surface of the fuel-electrode current-collection portion 21. As a result, two side surfaces along the width direction (y-axis direction) and the bottom surface of the rectangular-parallelepiped-like interconnector 30 are, within the recess 21*b*, in contact with the fuel-electrode current-collecting portion 21. Thus, as compared with a configuration in which each of the rectangular-parallelepiped-like interconnectors 30 is laminated on (in contact with) the outer plane of the fuel-electrode current-collecting portion 21, the area of the interface between the fuel electrode 20 (the current-collecting portion 21) and the interconnector 30 can be increased. Thus, electron conductivity between the fuel electrode 20 and the interconnector 30 can be enhanced; as a result, the power output of the fuel cell can be increased.

Also, in the above-described embodiment, a plurality of the power-generating elements A are provided on each of the upper and lower surfaces of the flat-plate-like support substrate 10. Thus, as compared with the case where a plurality of the power-generating elements are provided on only one side of the support substrate, the number of the power-generating elements in the structure can be increased, whereby the power output of the fuel cell can be increased.

In the above-described embodiment, the solid electrolyte film 40 covers the outer surfaces of the fuel electrodes 20, longitudinally opposite end portions of the outer surfaces of the interconnectors 30, and the main surface of the support substrate 10. Meanwhile, no level difference exists among the outer surfaces of the fuel electrodes 20, the outer surfaces of the interconnectors 30, and the main surface of the support substrate 10. Thus, the solid electrolyte film 40 is flattened. As a result, as compared with the case where the solid electrolyte film 40 involves a level difference, there can be restrained the generation of crack in the solid electrolyte film 40 which could otherwise result from stress concentration, whereby deterioration in the gas seal function of the solid electrolyte film 40 can be restrained.

The present invention is not limited to the above-described embodiment, but may be modified in various other forms within the scope of the invention. For example, in the above embodiment, as shown in FIG. 6, etc., the planar shape (a shape as viewed from a direction perpendicular to the main surface of the support substrate 10) of the recess 12 formed in the support substrate 10 is a rectangular shape. However, the planar shape may be, for example, a square shape, a circular shape, an elliptic shape, or an elongated-hole shape.

Similarly, as shown in FIG. 3, etc., the planar shape (a shape as viewed from a direction perpendicular to the main surface of the support substrate 10) of the recess 21*b* formed in the fuel electrode 20 (the current-collecting portion 21) is a rectangular shape. However, the planar shape may be, for example, a square shape, a circular shape, an elliptic shape, or an elongated-hole shape. The recess 21*b* partially shares the side wall with the recess 12. That is, the side wall (circumferentially closed) of the recess 21*b* is partially of the material of the fuel electrode 20 (the current-collecting portion 21) and is partially of the material of the support substrate 10.

Also, in the above-described embodiment, the interconnector 30 is entirely embedded in each of the recesses 12. However, only a portion of the interconnector 30 may be embedded in each of the recesses 12 while the remaining portion of the interconnector 30 projects outward from the recess 12 (i.e., the remaining portion projects from the main surface of the support substrate 10).

Figure 15:
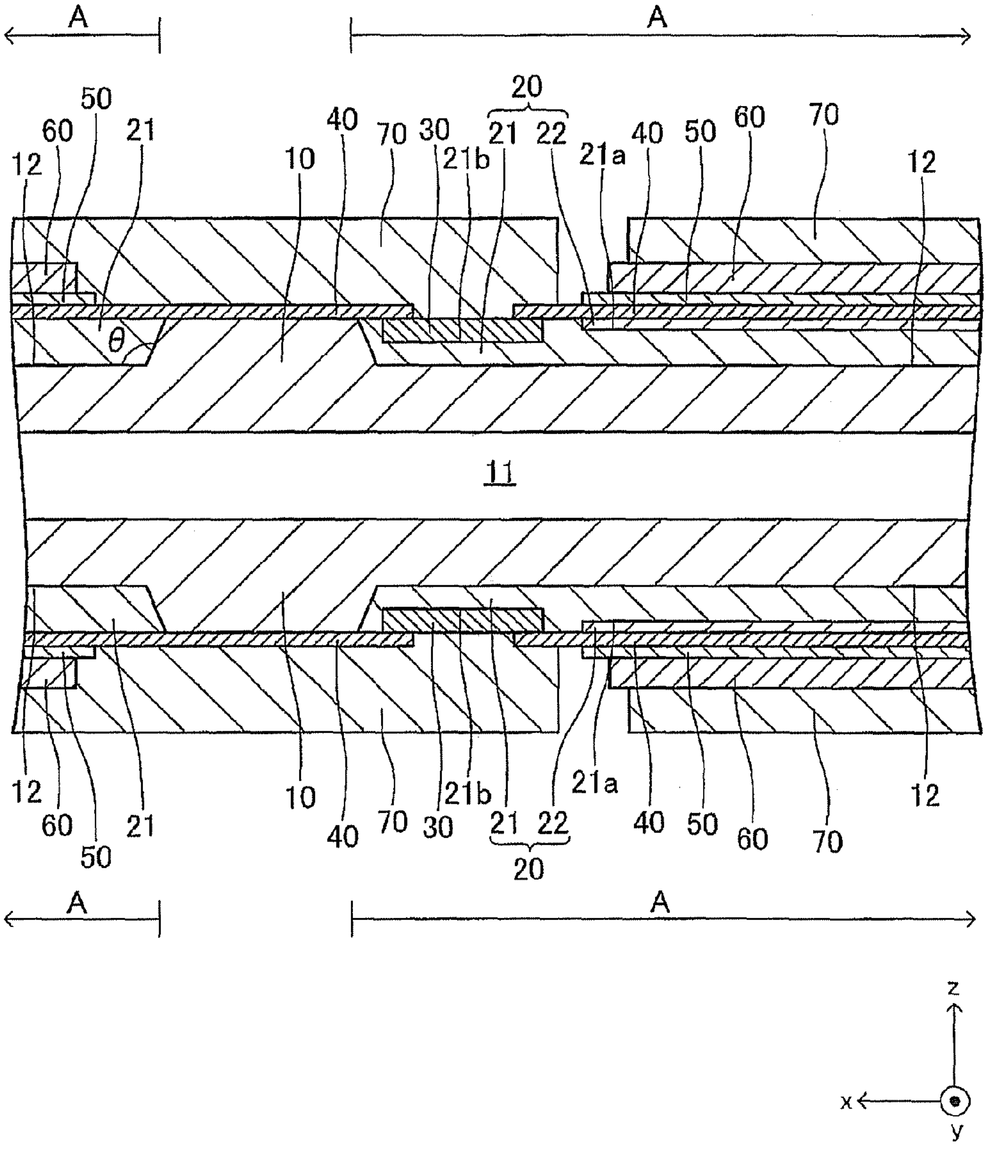
FIG. 15 Sectional view corresponding to FIG. 2, showing a first modified embodiment of the structure of the fuel cell according to the present invention.
Figure 16:
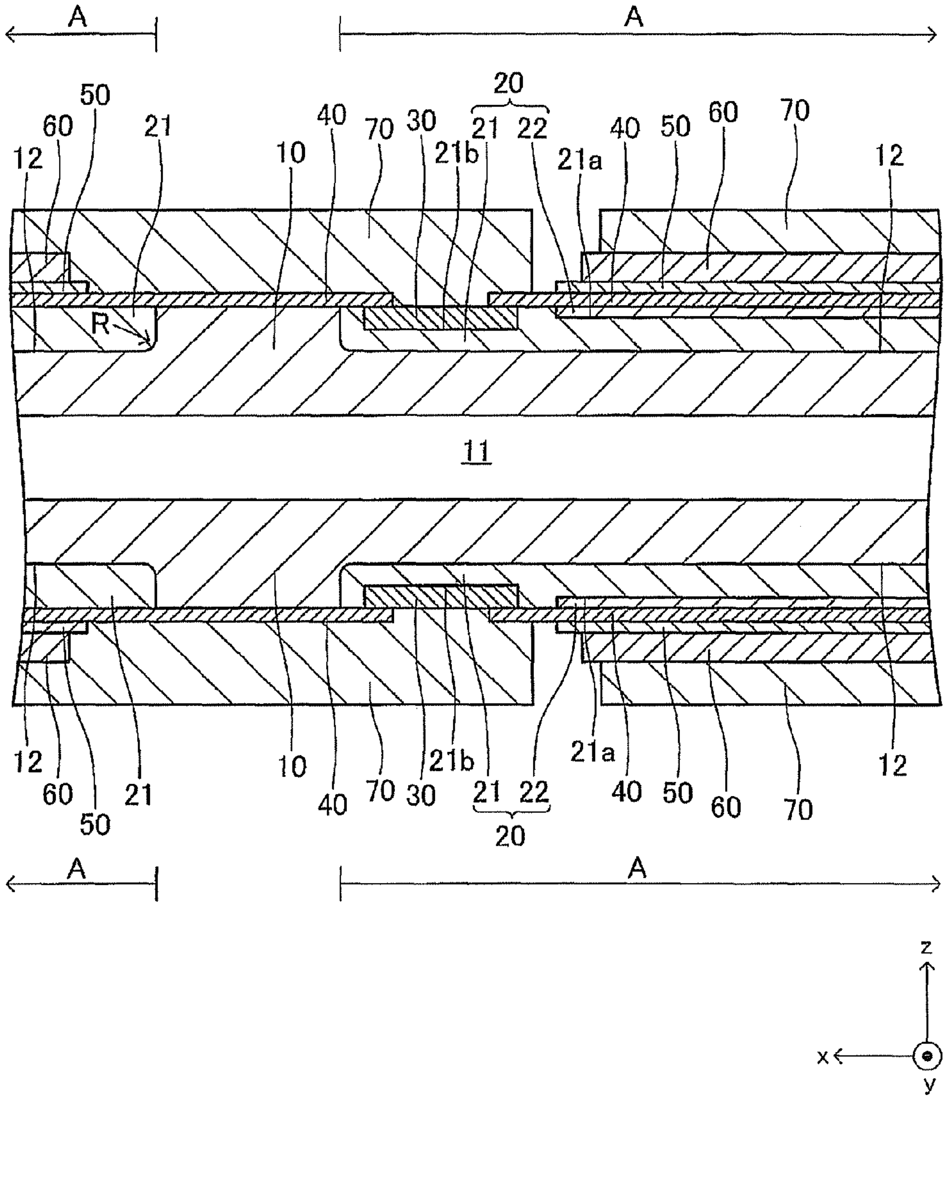
FIG. 16 Sectional view corresponding to FIG. 2, showing a second modified embodiment of the structure of the fuel cell according to the present invention.

Also, in the above-described embodiment, the bottom wall and the side wall of the recess 12 forms an angle θ of 90°. However, as shown in FIG. 15, the angle θ may be 90° to 135°. Also, in the above embodiment, as shown in FIG. 16, the bottom wall and the side wall of the recess 12 may intersect with each other along an arc having a radius R such that the ratio of the radius R to the depth of the recess 12 is 0.01 to 1.

Figure 17:
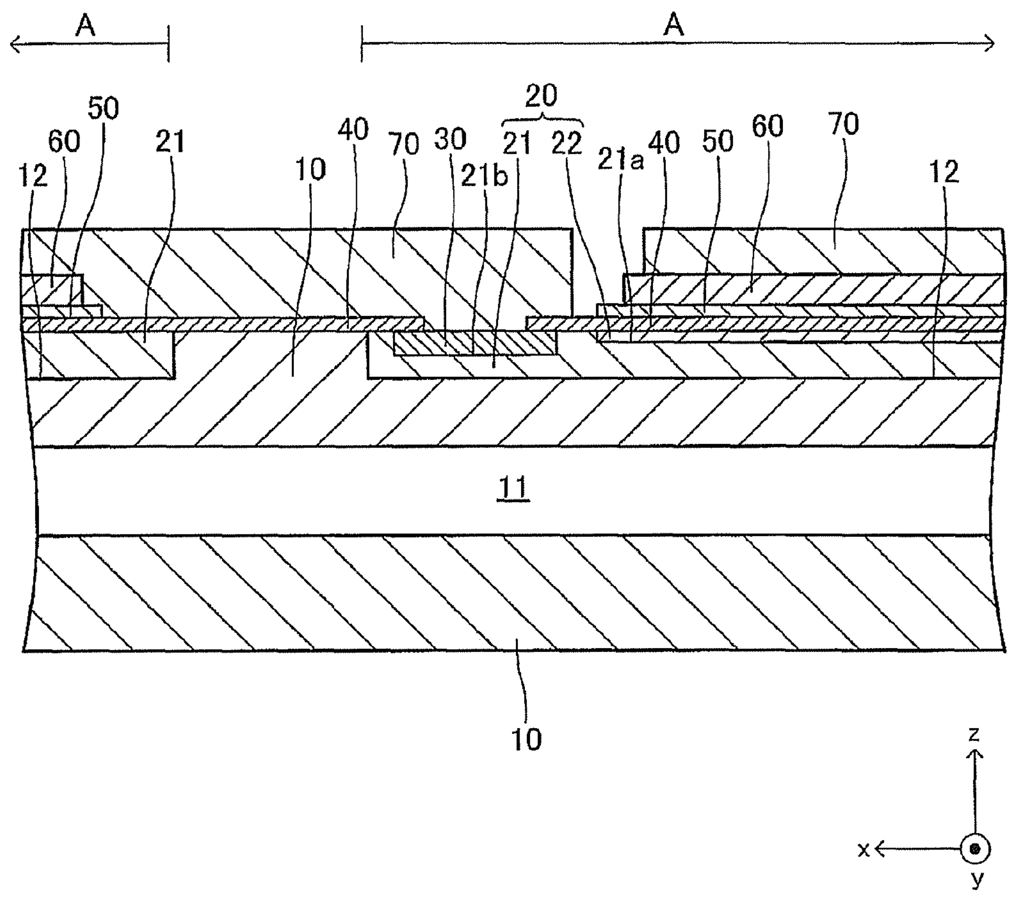
FIG. 17 Sectional view corresponding to FIG. 2, showing a third modified embodiment of the structure of the fuel cell according to the present invention.

Also, in the above-described embodiment, the flat-plate-like support substrate 10 has a plurality of the recesses 12 formed on and a plurality of the power-generating elements A provided on each of the upper and lower surfaces thereof. However, as shown in FIG. 17, the support substrate 10 may have a plurality of the recesses 12 formed on and a plurality of the power-generating elements A provided on only the surface on one side thereof.

In the above-described embodiment, the fuel electrode 20 is configured in two layers consisting of the fuel-electrode current-collecting portion 21 and a fuel-electrode active portion 22. However, the fuel electrode 20 may be configured in a single layer equivalent to the fuel-electrode active portion 22. Additionally, in the above embodiment, the "inner electrode" and the "outer electrode" are the fuel electrode and the air electrode, respectively. However, they may be reversed.

Additionally, in the above-described embodiment, as shown in FIG. 3, the recess 21*b* formed on the outer surface of the fuel-electrode current-collecting portion 21 is a rectangular-parallelepiped-like depression defined by the bottom wall of the material of the fuel-electrode current-collecting portion 21 and the side walls (two side walls of the material of the support substrate 10 extending along the longitudinal direction and two side walls of the material of the fuel-electrode current-collecting portion 21 extending along the width direction) arranged in a circumferentially closed manner. As a result, two side surfaces along the width direction and the bottom surface of the interconnector 30 embedded in the recess 21*b* are, within the recess 21*b*, in contact with the fuel-electrode current-collecting portion 21.

Figure 18:
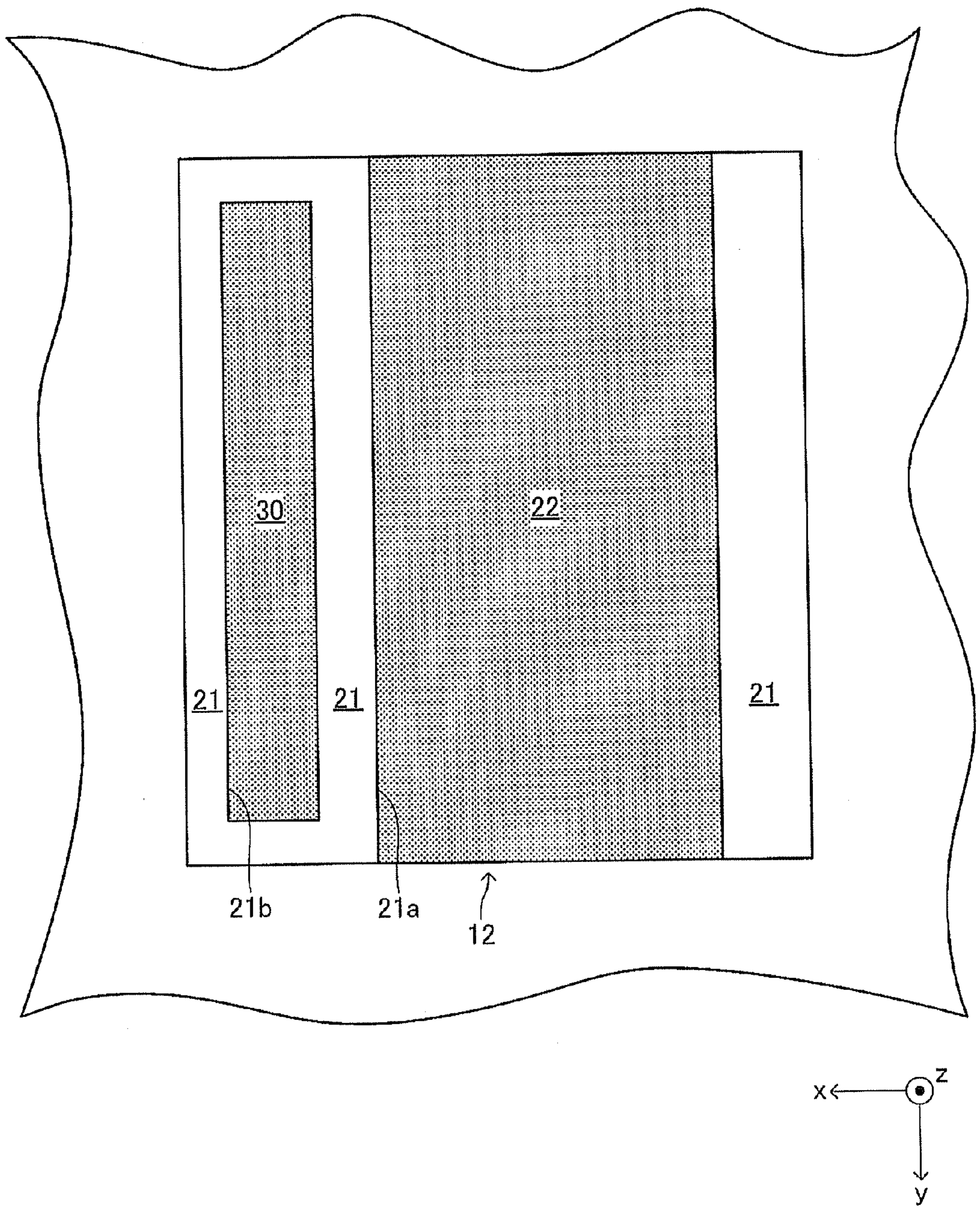
FIG. 18 Sectional view corresponding to FIG. 3, showing a fourth modified embodiment of the structure of the fuel cell according to the present invention.

Meanwhile, as shown in FIG. 18, the recess 21*b* formed on the outer surface of the fuel-electrode current-collecting portion 21 may be a rectangular-parallelepiped-like depression defined by the bottom wall of the material of the fuel-electrode current-collecting portion 21 and the side walls (two side walls along the longitudinal direction and two side wails along the width direction) of the material of the fuel-electrode current-collecting portion 21 arranged in a circumferentially closed manner. According to this feature, the bottom surface and all of the four side surfaces of the interconnector 30 embedded in the recess 21*b* are, within the recess 21*b*, in contact with the fuel-electrode current-collecting portion 21. Thus, the area of the interface between the fuel-electrode current-collecting portion 21 and the interconnector 30 can be further increased. Therefore, the electron conductivity between the fuel-electrode current-collecting portion 21 and the interconnector 30 can be further enhanced; as a result, the power output of the fuel cell can be further increased.

The invention claimed is:

1. A structure of a fuel cell comprising:

a planar porous support substrate having a gas flow channel formed therein;

a plurality of power-generating elements provided on a main surface of the planar support substrate at a plurality of positions, respectively, located apart from one another, each of the power-generating elements being a laminate of at least an inner electrode, a solid electrolyte, and an outer electrode; and a single or a plurality of electrical connections provided between a pair of or pairs of adjacent power-generating elements and adapted to electrically connect the inner electrode of one of the adjacent power-generating elements and the outer electrode of the other one of the adjacent power-generating elements;

wherein the inner electrodes and the outer electrodes are fuel electrodes and air electrodes, respectively, wherein each of the fuel electrodes comprises a fuel-electrode active portion in contact with the solid electrolyte, and a remaining fuel-electrode current-collecting portion, wherein substance having oxygen ion conductivity in the fuel-electrode active portion has a volume ratio that is higher than a substance having oxygen ion conductivity in the fuel-electrode current-collecting portion, wherein the fuel-electrode current-collecting portions are embedded in recesses are formed on the main surface of the planar support substrate at the plurality of positions, respectively, each of the recesses having a bottom wall formed of a material of the support substrate and a circumferentially closed side wall formed entirely of the material of the support substrate, and wherein the fuel-electrode active portions are embedded in a recess formed on an upper surface of the fuel-electrode current-collecting portions so that the inner electrodes of the power-generating elements are embedded in the respective recesses.

2. A structure of a fuel cell according to claim 1, wherein the main surface of the support substrate and outer surfaces of the inner electrodes constitute a single plane.

3. A structure of a fuel cell according to claim 1, wherein the bottom wall and the side wall of each of the recesses form an angle of 90° to 135°.

4. A structure of a fuel cell according to claim 1, wherein the bottom wall and the side wall of each of the recesses intersect with each other along an arc, and the ratio of a radius of the arc to a depth of the recess is 0.01 to 1.

5. A structure of a fuel cell according to claim 1, wherein the plurality of recesses are formed on each of opposite, parallel main surfaces of the planar support substrate, and the inner electrodes of the power-generating elements are embedded in the respective recesses formed on the opposite main surfaces of the support substrate, whereby the plurality of power-generating elements are provided on the opposite main surfaces of the support substrate.

6. A structure of a fuel cell according to claim 2, wherein the bottom wall and the side wall of each of the recesses form an angle of 90° to 135°.

7. A structure of a fuel cell according to claim 2, wherein the bottom wall and the side wall of each of the recesses intersect with each other along an arc, and the ratio of a radius of the are to a depth of the recess is 0.01 to 1.

8. A structure of a fuel cell according to claim 3, wherein the bottom wall and the side wall of each of the recesses intersect with each other along an arc, and the ratio of a radius of the arc to a depth of the recess is 0.01 to 1.

9. A structure of a fuel cell according to claim 2, wherein the plurality of recesses are formed on each of opposite, parallel main surfaces of the planar support substrate, and the inner electrodes of the power-generating elements are embedded in the respective recesses formed on the opposite main surfaces of the support substrate, whereby the plurality of power-generating elements are provided on the opposite main surfaces of the support substrate.

10. A structure of a fuel cell according to claim 3, wherein the plurality of recesses are formed on each of opposite, parallel main surfaces of the planar support substrate, and the inner electrodes of the power-generating elements are embedded in the respective recesses formed on the opposite main surfaces of the support substrate, whereby the plurality of power-generating elements are provided on the opposite main surfaces of the support substrate.

11. A structure of a fuel cell according to claim 4, wherein the plurality of recesses are formed on each of opposite, parallel main surfaces of the planar support substrate, and the inner electrodes of the power-generating elements are embedded in the respective recesses formed on the opposite main surfaces of the support substrate, whereby the plurality of power-generating elements are provided on the opposite main surfaces of the support substrate.

12. A structure of a fuel cell according to claim 1, wherein the circumferentially closed side wall is in the shape of a polygon.

13. A structure of a fuel cell according to claim 1, wherein the circumferentially closed side wall has at least two sections that intersect one another.

* * * * *